(12) United States Patent
Englund

(10) Patent No.: US 7,703,359 B2
(45) Date of Patent: Apr. 27, 2010

(54) CUTTING TOOL COMPONENT AND A METHOD OF MANUFACTURING SAME

(75) Inventor: Kjell Englund, Valbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/965,198

(22) Filed: Oct. 15, 2004

(65) Prior Publication Data
US 2005/0129471 A1 Jun. 16, 2005

(30) Foreign Application Priority Data
Oct. 16, 2003 (SE) .................................. 0302729

(51) Int. Cl.
B23B 3/00 (2006.01)
B26D 5/00 (2006.01)

(52) U.S. Cl. .................. 82/1.11; 407/102; 407/101

(58) Field of Classification Search ................ 407/110, 407/101, 102, 103, 48, 40, 53, 33, 34, 64; 82/160, 158, 1.11
See application file for complete search history.

(56) References Cited

U.S. PATENT DOCUMENTS

| | | | | |
|---|---|---|---|---|
| 2,453,959 A | | 11/1948 | Anthony et al. | |
| 3,059,316 A | * | 10/1962 | Berry, Jr. et al. | 407/101 |
| 3,739,562 A | * | 6/1973 | McNamara | 56/400.06 |
| 4,219,717 A | * | 8/1980 | Kuhnen | 219/61 |
| 5,318,216 A | * | 6/1994 | Berniolles | 228/171 |
| 5,865,571 A | * | 2/1999 | Tankala et al. | 408/1 R |
| 6,035,844 A | * | 3/2000 | Otani et al. | 125/15 |
| 6,186,704 B1 | * | 2/2001 | Hale | 407/101 |
| 6,270,294 B1 | * | 8/2001 | Sjoo et al. | 407/101 |
| 6,369,352 B1 | * | 4/2002 | Aman et al. | 219/121.63 |
| 6,599,050 B1 | * | 7/2003 | Sjoo | 403/97 |
| 6,601,486 B2 | * | 8/2003 | Hansson et al. | 82/161 |
| 6,880,437 B2 | * | 4/2005 | Sjoo et al. | 82/158 |
| 7,128,066 B2 | * | 10/2006 | Lee et al. | 125/22 |
| 7,477,007 B2 | * | 1/2009 | Suzuki et al. | 313/141 |
| 2003/0210961 A1 | | 11/2003 | Arvidsson | |
| 2004/0101371 A1 | | 5/2004 | Arvidsson et al. | |

FOREIGN PATENT DOCUMENTS

| | | |
|---|---|---|
| EP | 0 037 691 A3 | 10/1981 |
| WO | WO 97/11806 | 4/1997 |
| WO | WO 01/64377 A1 | 9/2001 |

* cited by examiner

*Primary Examiner*—Will Fridie, Jr.
(74) *Attorney, Agent, or Firm*—Drinker Biddle & Reath LLP

(57) ABSTRACT

A cutting tool includes two parts releasably interconnectable via serration surfaces which are mechanically engageable in each other. At least one of the parts is composed of a first body and a supplemental body on which the serration surface of the one part is formed, and which via a permanent joint is stiffly united to the first body. The permanent joint can be established by laser-welding a shim disposed between the first body and the supplemental body.

5 Claims, 3 Drawing Sheets

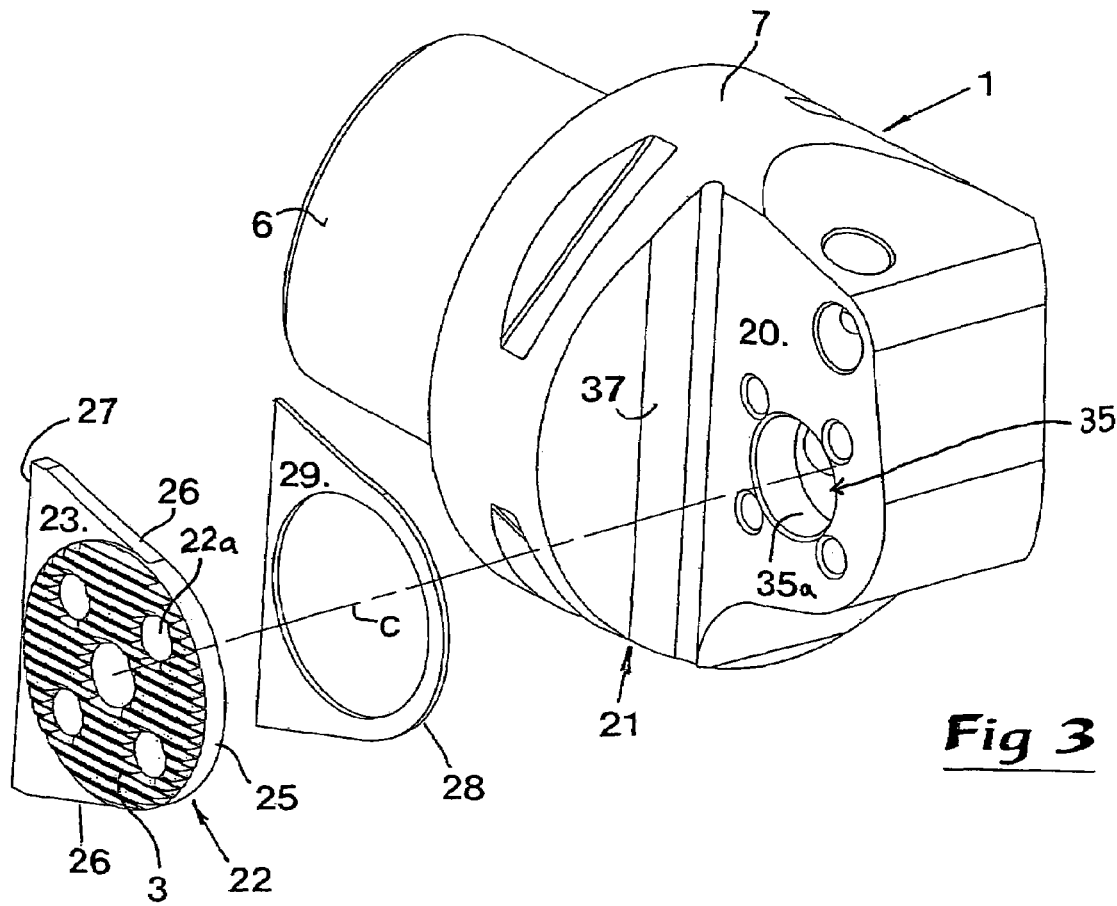
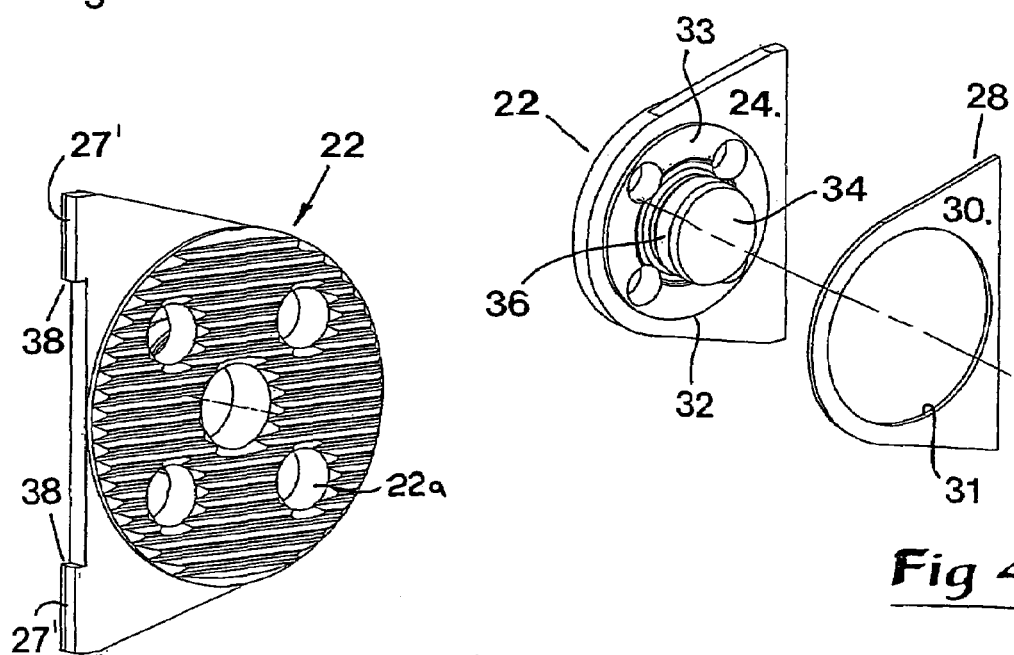

CUTTING TOOL COMPONENT AND A METHOD OF MANUFACTURING SAME

The present application claims priority under 35 U.S.C. §119 to Patent Application Serial No. 0302729-9 filed in Sweden on Oct. 16, 2003, the content of which is hereby incorporated by reference.

TECHNICAL FIELD OF THE INVENTION

In one aspect, this invention relates to a cutting tool of the type that comprises two parts, which are releasably interconnectable via serration surfaces, which are mechanically engageable with each other.

PRIOR ART

An overwhelming share of the tools, which are found in all three main disciplines within the modern technique for cutting or chip-removing machining, are assembled from two or more parts, which can be released from each other. For instance, cutting inserts and other types of hard machining members of rotatable tools, such as milling cutters and drills, are mounted on miscellaneous basic bodies or coupling parts. In turning tools, a coupling part or adapter is most often included with which an insert-carrying or edge-carrying machining part is releasably connected, e.g. a blade part having a slotting tool for parting or groove-slotting operations.

A general requirement of all kinds of cutting tools, which are composed of two or more parts, is that repeated mounting and dismounting of the parts should be able to be carried out while retaining good precision between the parts in question, e.g. between a basic body and a cutting insert clamped in a tool holder, such that the spatial position for one or more active chip-removing cutting edges should always be the same, even if one of the parts frequently is dismounted or exchanged. The requirements of such position precision are also high in respect of rigidity and shape stability in the joint between the parts. Thus, the joint should withstand prescribed force loads without the cutting edges being dislodged from the predetermined, geometrically exact position thereof.

Against the background above, it has recently become more and more popular to achieve the joint between releasably connected tool parts by means of so-called serration surfaces on the respective parts. The concept of serration surface (at times only "serration") as this is used by those skilled in the art is extensive and partly vague, so far that it encompasses a number of different practical embodiments. However, in the simplest form thereof, a serration surface includes a plurality of straight and mutually parallel ridges, which are spaced apart by intermediate scores or grooves, and which are intended to engage grooves present between analogous ridges in the second serration surface with which the same should cooperate. The ridges in older serration surfaces have a genuine trapezoid cross-section shape, so far that the individual ridge profile is formed with entirely planar or smooth flanks, which form approximately an angle of 60° to each other. However, recently serration surfaces have also been developed, the ridges of which have a partially curved shape with the purpose of improving the contact between the flanks (see SE-0100052-0).

Furthermore, characteristic of serration surfaces or connecting surfaces of the kind in question is that the tops or crowns of the ridges do not bottom-out in the appurtenant scores. In such a way, it is guaranteed that only the flanks of the ridges are pressed against each other, the ridges being steadily wedged up in each other.

Serration surfaces that solely make use of straight and mutually parallel ridges are single-acting in the sense that they (in addition to rotation) prevent straight relative motions between the respective parts in only one direction, viz., in a direction perpendicular to the length extension of the ridges. However, straight relative motions are not prevented in the direction parallel to the ridges. Therefore, the purpose of preventing relative motions of the last-mentioned type has to be solved in another way, e.g. by fixation by means of different types of clamping elements, such as screws, clamps, etc., or by cooperation between shoulders on the respective parts.

In the category of single-acting serration surfaces, one should include surfaces wherein only one straight ridge is formed on one of the tool parts and a single complementary groove is formed in the second part.

In addition to single-acting serration surfaces, serration surfaces are also found that are double-acting, in that they prevent relative motions in two directions perpendicular to each other between two coupled parts. One type of such surfaces consists of so-called cross serrations, which make use of one or more ridges/scores extending at an angle, e.g. a right angle, to one or more other ridges/scores in the same surface. A particular sub-group of such surfaces are formed with honeycomb patterns made by a plurality of parallel scores in a first set of scores and ridges being brought to intersect the ridges in a second set of ridges and scores, which extend at a right or an other angle to the scores/the ridges in the first set.

In SE 0200867-0 a recently developed type of serration surfaces is furthermore described in which the ridges and scores generally have a curved shape instead of a straight one. These also belong to the category double-acting serration surfaces because they prevent translation motions in two directions perpendicular to each other.

When a serration surface is found on, for instance, a compression-moulded (and sintered) cemented carbide insert, the design of the same does normally not offer any difficulties of any note. However, when a corresponding serration surface should be formed on another, cooperating part, such as a basic body, a coupling part, or an adapter, at times problems difficult to master may arise. Such parts are primarily made from steel, the serration surface being formed by suitable machining in the steel material, such as milling, grinding, hobbing, sparking, etc. By virtue of the physical shape of the individual tool part, which at times may be fairly complicated, it may, however, become difficult and at times impossible to form a serration surface having the desired shape on the very surface field on which serrations are desirable. An example of a tool that is difficult to form with serration surfaces is a turning tool such as a slotting tool, which is shown on the appended drawings with the purpose of illustrating the invention. However, in addition to turning tools, numerous examples of rotatable tools are also found, such as drills and milling cutters, in which the surface fields in question are difficult to access to enable, for instance, a milling cutter to cut therein a serration surface. In this connection, it should also be pointed out that a surface field in question on a basic body or the like, may be accessible, per se, for achievement of a single-acting serration surface, i.e., a surface which includes ridges, which all extend in one and the same direction, but wherein double-acting serration surfaces are impossible to form because the milling cutter can only be moved in one direction. Many times, also mediocre compromises are resorted to, which, for instance, consist of locating the serration surface farther away from an obstacle to the milling cutter than what is desirable; something that in turn may lead to the cutting tool becoming longer or more ungainly than necessary.

OBJECTS AND FEATURES OF THE INVENTION

The present invention aims at managing the above-mentioned problems and at improving the flexibility in respect of the possibilities of forming cutting tools having expedient serration surfaces independently of the type, shape or location thereof on the tool. Thus, a primary object of the invention is to provide a cutting tool, which can be formed of parts, which do not require milling or the like machining with the purpose of integrating a desired serration surface in the same. An additional object is to provide a cutting tool having a serration surface formed on at least one part of the tool, which if required may be given other properties, e.g. in respect of hardness, strength and resistance to wear, than those properties that are determined by the material in the proper tool part.

According to the invention, a cutting tool is provided which comprises first and second parts each having a serration surface disposed thereon. The serration surfaces are in intermeshing relationship. At least one of the parts includes a first body and a supplemental body. The supplemental body is permanently rigidly secured to the first body and has the respective serration surface formed directly thereon and facing away from the first body.

In another aspect, the invention also relates to a part belonging to a cutting tool of the type that comprises a serration surface for mechanical engagement with an analogous serration surface on another tool part. That is, an assembly comprises a first body and a supplemental body which is permanently rigidly secured to the first body. The supplemental body has a serration surface formed thereon.

In an additional aspect, the invention also aims at providing a method for the manufacture of cutting tools of the kind in question. The method comprises the steps of:
  A. providing a first body;
  B. providing a supplemental body having a serration surface formed thereon; and
  C. permanently rigidly securing the supplemental body to the first body such that the serration surface faces away from the first body.

The invention is based on the intention to assemble the part or the parts of a cutting tool, which should carry a serration surface, from a first body as well as a second, supplement-like (or supplemental) body, on which the serration surface is formed, and which via a permanent joint is stiffly united to the first body. The supplement-like body, which carries the serration surface, may for instance be in the form of a comparatively thin plate, one side of which is entirely or partly occupied by a serration surface, and the opposite side of which is permanently connected to the first body or main body, which forms a main component in the tool part in question and which usually is manufactured from steel. The permanent joint between the two bodies in the tool part can be realized in many different ways and may also include a plurality of different types of part joints. In order to, from a general point of view, retain the serration surface-carrying body on the main body, welded joints or glue joints may accordingly be utilized. However, simultaneously the permanent joint may also include means in order to prevent or counteract rotary as well as translation motions between the bodies (besides the welded joint or glue joint).

In this connection, it should be pointed out that, in cutting tools, it is previously known to use plate-shaped shims having a serration surface on at least one of the two opposite sides (at times on both sides). Such shims are particularly usual between cutting inserts and basic bodies. However, in such cases, the shim is not permanently united to the appurtenant basic body, but may be released in the same way as the cutting insert.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 3 is another perspective exploded view of FIG. 1 showing the adapter body, the serration plate and a shim therebetween.

FIG. 4 is a perspective exploded view showing the back sides of the serration plate and the shim.

FIG. 5 is a perspective view illustrating an alternative embodiment of a serration plate.

DESCRIPTION OF PREFERRED EMBODIMENTS OF THE INVENTION

Figure 1:
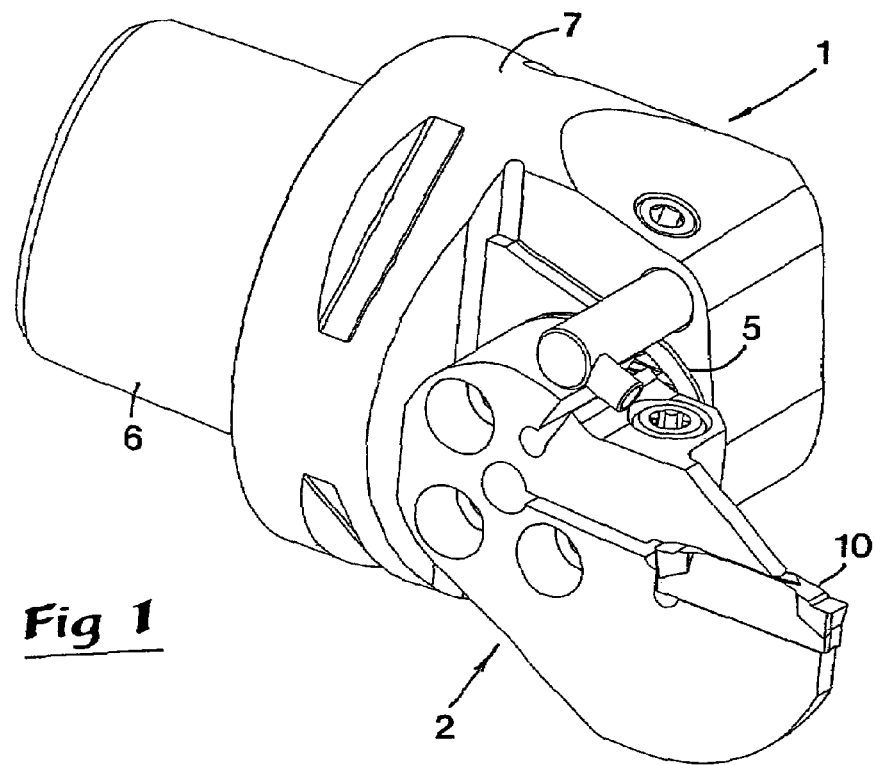
FIG. 1 is a perspective view of a cutting tool according to the invention that has been exemplified in the form of a turning tool intended for parting or groove slotting and which includes two parts releasably coupled together with each other, viz. an adapter and a blade part, in which a slotting tool is applied.
Figure 2:
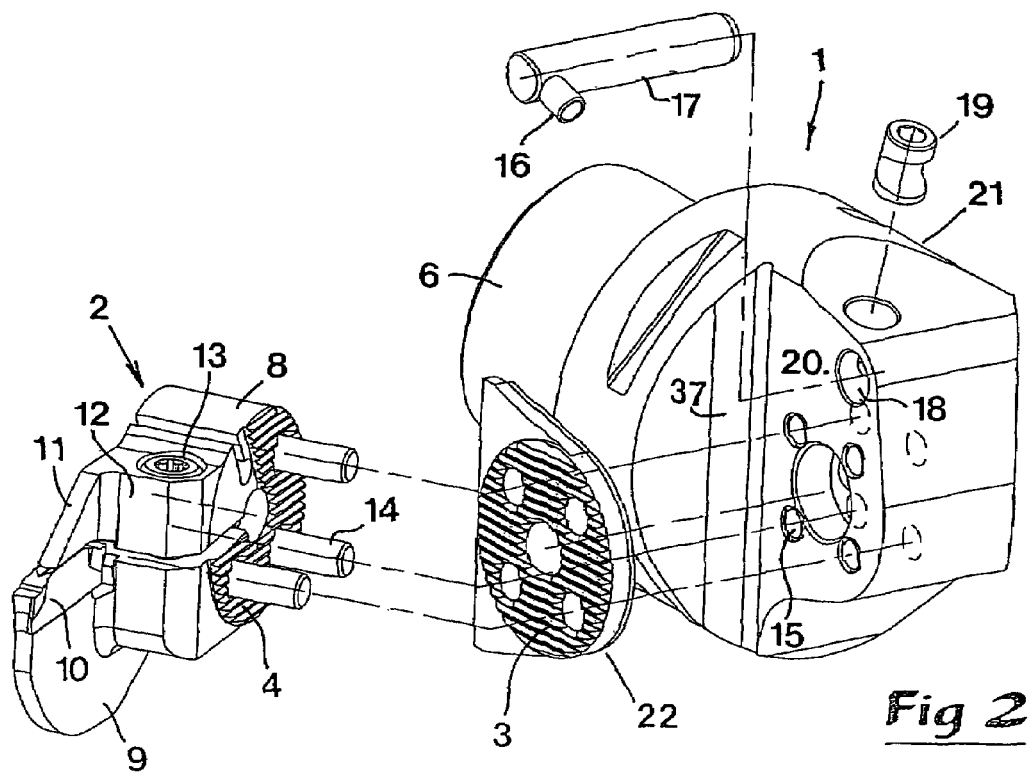
FIG. 2 is a perspective exploded view of FIG. 1, showing the blade part separated from the adapter, as well as a plate formed with a serration surface separated from the real adapter body.

The cutting tool illustrated in FIGS. 1 and 2 includes two parts 1, 2, which are releasably connected with each other via serration surfaces 3, 4. When said surfaces 3, 4 are brought to engagement with each other, the same are included in an interface designated 5 (see FIG. 1) between the parts 1 and 2. In the chosen embodiment example, the tool consists of a turning tool, more precisely a so-called slotting tool of the type that is used for parting or groove-slotting operations. Therefore, the part 1 consists of an adapter or coupling part, which is usually formed of steel and which includes a rear coupling piece 6 and a front, coarser head 7.

The part 2 consists of a machining part, which commonly is denominated a blade part, and which in addition to a comparatively robust body 8 includes a leaf-shaped portion 9, in which a thin, replaceable slotting tool or cutting insert 10 may be clamped. During use of the tool, the serration surface 3 is integrated with the adapter 1, while the serration surface 4 is included in the releasable, insert-carrying machining part 2. In this connection, reference being made to FIG. 2, it should be pointed out that the cutting insert 10 is clamped in an appurtenant seating by means of a clamping nose 11, which is included in an upper, elastically resilient portion 12 in the body 8, and which can be secured to a lower portion of the body by means of a tightening screw 13. Furthermore, the part 2 carries three laterally projecting screws 14, which are tightenable in threaded holes 15 in the adapter 1, and which have the purpose of fixing the parts 1 and 2 in relation to each other.

In the usual way, also a nozzle or outlet 16 is included in the tool for spraying cooling liquid or the like against the cutting insert 10. Such cooling liquid is fed forward through channels in the interior of the adapter 1, more precisely from the tool holder (not shown) in which the coupling piece 6 is fixed. In the example, the nozzle 16 is included in a transverse sleeve 17, which is releasably mounted in a bore 18 by means of a clamping device 19.

As far as the shown tool has been generally described hitherto, the same is in all essentials previously known, except that in previously known tools, the serration surface 3 has been formed directly in the adapter 1, more precisely in the side surface 20 of the adapter 1. When this serration surface has been effected by milling, it has been necessary to locate the surface sufficiently far from the transverse wall 37, which projects from the rear limitation of the surface 20, in order for the milling cutter to avoid engaging the wall.

Characteristic of the present invention is that the tool part 1 is composed of a first body 21, as well as a second, supplemental body 22 on which the serration surface 3 is formed, and said two bodies being permanently united to each other via a joint. The joint can be realized in various ways, but which henceforth is denominated a permanent joint. Concerning the bodies 21, 22, it may generally be said that the first body 21 forms a main body, which in practice is generally greater than the supplemental body 22.

Now reference is also made to FIGS. 3 and 4, which in more detail illustrate the nature of the serration-carrying supplemental body 22. In the shown, preferred embodiment, the body 22 has the shape of a plate, the thickness of which may vary. However, the thickness of the plate 22 should in all events be smaller than the smallest extension of the serration surface 3 in question. Expressed in absolute numbers, the thickness of the plate should be within the range of 1-6 mm, suitably 2-4 mm. The two opposite sides or major faces 23, 24 of the plate are advantageously—although not necessarily—planar and mutually parallel. In the example, the serration surface 3 is of a single-acting type, i.e., the same includes a plurality of straight and mutually parallel ridges between which scores or grooves are defined having an analogous shape. The surface field that is occupied by the serrations has in this case a circular shape, while the contour shape of the plate in its entirety is different. More precisely, the plate has a partially circular and partially triangular shape, in that the same is delimited by a part-cylindrical edge surface 25, which transforms into two plane and straight edge surfaces 26, which diverge away from one another and form an acute angle to each other. The surfaces 26 end in a common, rear edge surface 27, which is generally straight and forms the base of an imaginary triangle defined by surfaces 26, 27.

As has been mentioned above, the permanent joint between the plate 22 and the main body 21 may be realized in various ways. One feasible way is to agglutinate the back side 24 of the plate against the planar side surface 20 of the main body. However, in the embodiment shown, a welded joint between the components in question is preferred. More precisely, welding may be effected by means of a laser welding technique, which recently has been developed and which in detail is described in the applicant's simultaneous patent application with the denomination "Cutting Tool Together with a Method for the Manufacture Thereof." Briefly, this technique is based on the concept of applying a shim in a gap between two tool parts which are to be welded together, which shim in a cool state is welded along the periphery thereof by means of at least one laser beam, which at a significant speed is brought to be moved along the periphery of the shim. During the movement thereof in relation to the shim and surrounding portions of the tool parts, the laser beam melts the metal in the shim and the tool parts, respectively, in very limited, almost point-like areas, the size of which is determined by the diameter of the laser beam. In such a way, welding and the ensuing heat release take place very locally in a point area, which quickly is moved along the shim. This ensures that heat deformations, heat embrittlement and the like, do not arise in the interfaces or contact surfaces between the shim and the tool parts.

In FIGS. 3 and 4, such a welded shim 28 is shown, which generally is ring-shaped and has a contour shape that substantially corresponds to the contour shape of the plate 22. Furthermore, the shim is thin and flat, in that it is delimited by two planar surfaces 29, 30, intended to be pressed against the surfaces 24 and 20, respectively. The thickness of the shim may in practice be within the range of 0.5-1.0 mm. A hole designated 31 in the shim has substantially the same diameter as a raised cylindrical shoulder 32 disposed on the inside of the plate 22. A planar surface 33 on said shoulder is pressed against the surface 20. The shoulder has substantially the same thickness as the shim 28, from which it follows that the shim substantially completely occupies the ring-shaped gap formed between the surfaces 20, 24, upon assembly of the bodies 21, 22.

In practice, the main body 21 of the exemplified adapter may be manufactured from carbon steel, e.g., a steel of the type THG 2000, which is a chrome-molybdenum-vanadium-alloyed steel, the carbon content of which is within the range of 0.35-0.42%. Also in the supplemental body or plate 22, a steel may be used having a certain carbon content, e.g. 332541 or 332230. In such cases, the shim 28 may advantageously be made from an austenitic steel, in particular an austenitic steel of a stainless type, i.e., a material that has been alloyed with suitable quantities of chromium and nickel.

In this connection, it should be pointed out that the invention, by the measure of forming the serration surface in a separate supplement body, offers the advantage of forming the supplement body from a material having properties much different from the material in the main body 21. In particular, the possibility is offered of making the supplemental body from a material that is considerably harder and more resistant to impact, heat and wear than the material in the main body. A particular advantage in this respect is that the supplemental body can be manufactured in a way other than the main body, e.g., by compression moulding instead of by steel machining.

From the center of the shoulder 32, a male member 34 extends in the form of a spigot, which is intended to cooperate with a female-like seating 35 in the main body 21. Said male projection or spigot 34 has a cylindrical or rotationally symmetrical envelope surface 36, the diameter of which is somewhat greater than the inner diameter of the cylindrical surface 35a that defines the seating 35, e.g., greater by 0.01-0.03 mm, so that when the spigot is inserted into the seating, a press fit is established between the contact surfaces 35a, 36.

Although the described welded joint (or alternatively a glue joint) by itself counteracts displacements or relative motions between the bodies 21, 22, the male-female joint formed by the spigot 34 and the seating 35 also contributes to a large extent to fix the bodies in relation to each other. Regardless of whether forces that act on the plate 22 are oriented parallel or perpendicularly to the ridges and the grooves in the serration surface 3, the male-female joint guarantees a stable anchorage of the plate in relation to the main body 22. However, the male-female joint does not contribute to preventing rotation of the plate around the geometrical center axis C, which is constituted by the spigot and the seating. Although the weld or glue joint counteracts tendencies of the plate to be angularly displaced the invention, in order to additionally strengthen the joint in respect of torsion stresses, envisages a particular, additional part joint of mechanical character. Thus, the shoulder surface or transverse wall 37 of the main body, which extends at an angle, suitably a right angle to the surface 20, cooperates with the straight, rear edge surface 27 on the plate 22. If the angle between the surfaces 20 and 37 is ninety degrees, then the planar rear edge surface 27 of the plate 22 extends perpendicularly to the plane of the plate. In addition, the radius or the radial distance between the edge surface 27 and the geometrical center axis C of the spigot 34 is at least as large as the distance between the same geometrical center axis C of the seating 35 and the transverse surface 37. If the first-mentioned distance (between the surface 27 and the axis C) is slightly, e.g., a few hundredths of a millimeter, greater than the last-mentioned distance, the surfaces 27, 37 will be pressed against each other with a certain press fit, when the spigot 34 is pressed into the seating 35. In such a way, a distinct mechanical locking of the plate in relation to the main body 21 is provided; something which in practice eliminates the risk of rotating the plate in relation to the main body. When attaching the part 2 to the adapter 1, the screws 14 will extend through respective holes 22a formed through the plate 22.

In FIG. 5, an alternative, and most preferred, embodiment of the serration-carrying supplement body 22 is shown. In this case, the rear edge of the supplement body is formed with two projections 38 spaced-apart in the longitudinal direction having planar support surfaces 27' for abutment against the shoulder surface 37 on the main body 21. By reducing the area of the support surfaces 27' and distancing the same from each other in this way, a two-point support is provided, which improves the conditions for a firm pressing of the supplement body against the shoulder surface 37. A two-point support may also be provided by means of a central countersink in the shoulder surface 37, at the same time as a straight rear edge surface 27 is kept on the supplement body 22.

Figure 6:
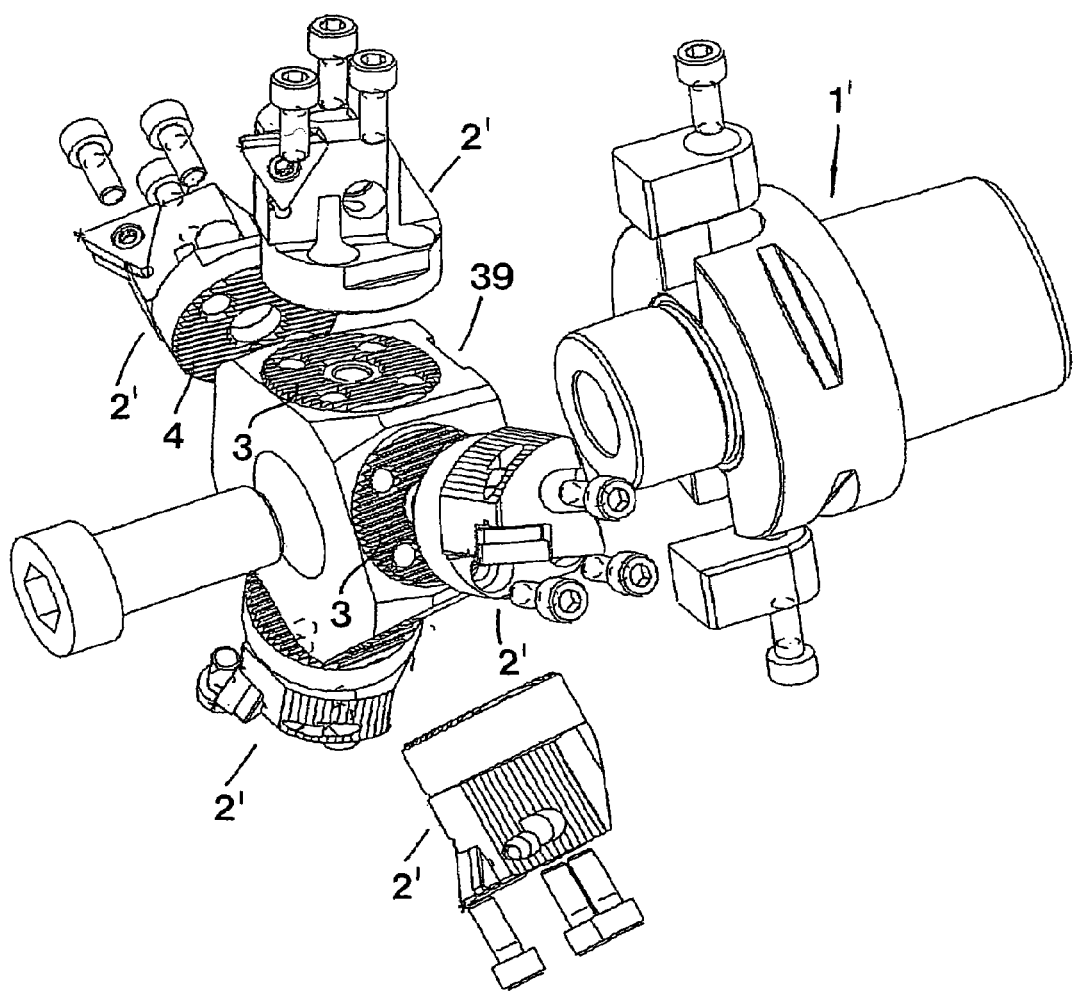
FIG. 6 is a perspective exploded view showing the invention applied on a multifunctional cutting tool.

In FIG. 6 an example of another cutting tool is shown, to which the invention is applicable. This tool consists of a recently developed so-called multitool having a coupling part 1' clampable in a tool holder, which coupling part includes a head 39 on which a plurality of machining parts 2' are applicable and possible to fix by means of cooperating pairs of serration surfaces 3, 4. In accordance with the invention, each of the serration surfaces 3, 4 is formed on a separate body or plate that is countersunk in the head 39 of the coupling part.

The possibility of countersinking the separate serrated plate or body in the main body of the tool part offers, by itself, an interesting possibility of providing an anti-rotation lock of the plate. Namely, if the plate and the countersink in which the same is housed are given an out of round shape, e.g., polygonal, rotary motion between the plate and the main body is made impossible in an easy, mechanical way.

FEASIBLE MODIFICATIONS OF THE INVENTION

The invention is not limited only to the embodiments described above and shown in the drawings. Thus, the invention is in no way limited to the type of turning tool and multi-tool, respectively, that are shown in FIGS. 1 and 6, but may be applied to any other cutting tools, such as other turning tools and rotatable tools, respectively, e.g., rotatable tools in the form of milling and drilling tools. In this connection, the physical shape of the main body and the serration-carrying supplemental body that together form an integrated unit is of no principal importance. Although a welded joint provided by means of laser technique is preferred in the requisite permanent joint between the two part bodies of the tool part in question, other joints, such as glue joints, may also be used. Furthermore, the mechanical locking means that advantageously—though not necessarily—may be included in the permanent joint, and that have the purpose of counteracting rotary and translation motions, respectively, between the bodies, may be realized in ways other than the one exemplified. In particular, the means of avoiding rotation may be varied in multiple ways within the scope of the general idea according to the invention.

This is also true of the design of the serration surfaces in question. Instead of being single-acting serration surfaces having only one type of straight serrations (i.e., ridges and scores), the surfaces or the coupling means in question may have arbitrary shapes. It is only essential that the two cooperating surfaces include male and female-like members that may engage each other mechanically with the purpose of counteracting relative motions between two coupled tool parts. In other words, application of the invention may be postulated also in connection with serration surfaces that may be developed in the future.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting tool comprising first and second parts each having a serration surface disposed thereon, the serration surfaces being in intermeshing relationship, wherein at least one of the first and second parts includes a main body and a supplemental body, the main body having a shoulder formed therein defined by a base surface and a wall angled to the base surface, the supplemental body being permanently rigidly secured to the base surface of the main body and having the respective serration surface formed directly thereon and facing away from the main body such that serrations on the serration surface extend immediately adjacent to the shoulder wall, wherein the supplemental body is welded to the main body by a metallic shim that is disposed between the main body and the supplemental body and that is laser welded along its outer periphery to the main body and the supplemental body.

2. The cutting tool according to claim 1 wherein at least one of the main body and the supplemental body comprises carbon steel, and the shim comprises austenitic steel.

3. The cutting tool according to claim 1 wherein the shim comprises a flat plate.

4. A cutting tool comprising first and second parts each having a serration surface disposed thereon, the serration surfaces being in intermeshing relationship, wherein at least one of the first and second parts includes a main body and a supplemental body, the main body having a shoulder formed therein defined by a base surface and a wall angled to the base surface, the supplemental body being permanently rigidly secured to the base surface of the main body and having the respective serration surface formed directly thereon and facing away from the main body such that serrations on the serration surface extend immediately adjacent to the shoulder wall, wherein the supplemental body is restrained against rotation relative to the main body, and wherein the supplemental body is of non-circular shape and includes an edge engaging the shoulder wall of the main body to prevent rotation of the supplemental body relative to the main body.

5. A method of manufacturing a cutting tool comprising the steps of:
A) providing a main body, the main body having a shoulder formed therein defined by a base surface and a wall angled to the base surface;

B) providing a supplemental body having a serration surface formed thereon; and
C) permanently rigidly securing the supplemental body to the base surface of the main body such that the serration surface faces away from the main body and such that serrations on the serration surface extend immediately adjacent to the shoulder wall, by positioning a shim between the main body and the second body and laser welding an outer periphery of the shim to the main body and the supplemental body.

* * * * *